G. W. MOON.
SEWER TRAP.
APPLICATION FILED OCT. 19, 1914.

1,137,516.    Patented Apr. 27, 1915.

WITNESSES:
Harry A. Benner
Jos. A. Michel

INVENTOR.
George W. Moon.
BY
Emil Starea
ATTORNEY.

UNITED STATES PATENT OFFICE.

GEORGE W. MOON, OF ST. LOUIS, MISSOURI.

SEWER-TRAP.

1,137,516.

Specification of Letters Patent.

Patented Apr. 27, 1915.

Application filed October 19, 1914. Serial No. 867,387.

*To all whom it may concern:*

Be it known that I, GEORGE W. MOON, a citizen of the United States, residing at St. Louis, State of Missouri, have invented certain new and useful Improvements in Sewer-Traps, of which the following is a full, clear, and exact description, reference being had to the accompanying drawings, forming a part hereof.

My invention has relation to improvements in valve-controlled sewer traps; and it consists in the novel features of construction more fully set forth in the specification and pointed out in the claim.

Figure 1:
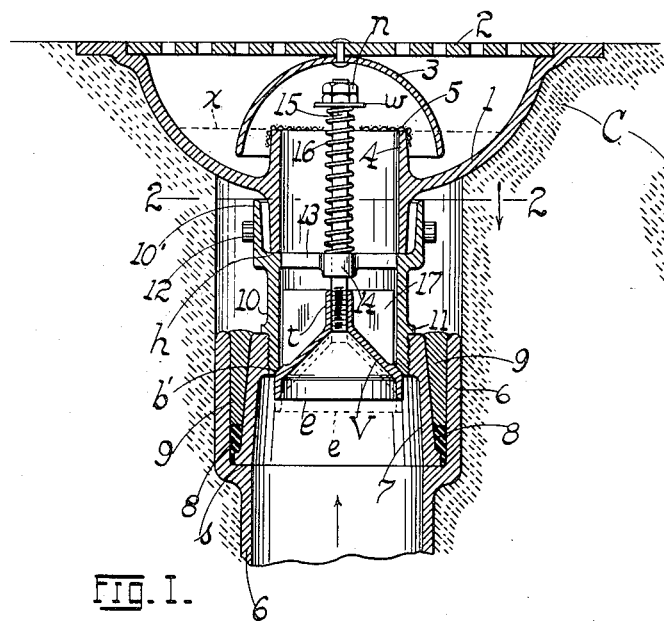
Figure 2:
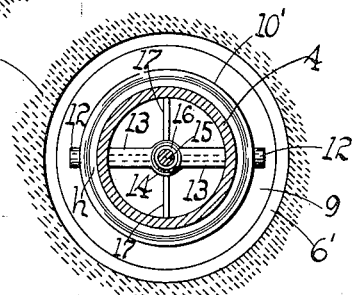
Figure 3:
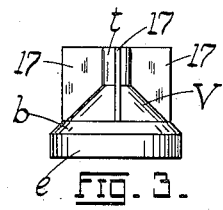
Figure 4:
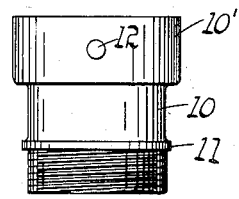
Figure 5:
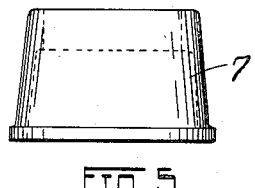
Figure 6:
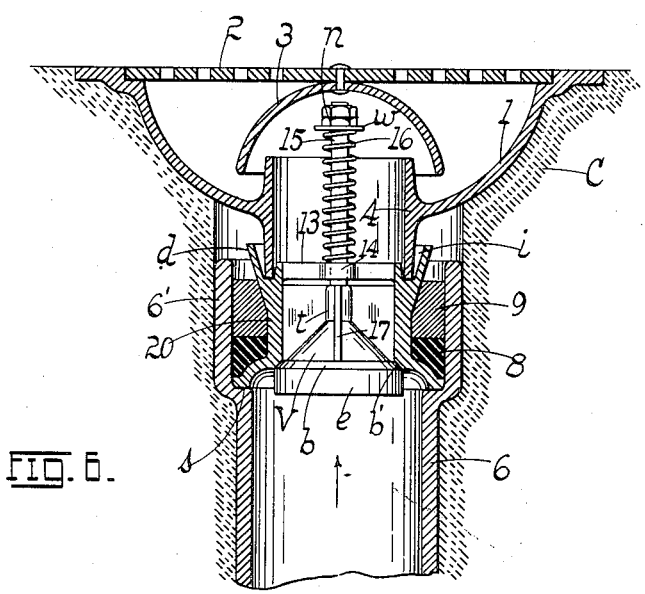

In the drawings, Figure 1 is a middle vertical section taken through a preferred form of trap; Fig. 2 is a horizontal cross-section on the line 2—2 of Fig. 1; Fig. 3 is a detached view of the valve in side elevation; Fig. 4 is a detached view of the valve-seat member and guide in side elevation; Fig. 5 is a side elevation of the ring supporting the valve-seat member; and Fig. 6 is a section similar to Fig. 1 showing a modified construction of trap.

The present invention has for its object the construction of a sewer trap which will effectively prevent not only the discharge of back-water through the trap but at the same time prevent the escape of foul and noxious sewer gas through the trap into the room or other place where the trap may be installed.

A further object is to construct a trap the valve of which will readily and instantly respond to any back pressure through the trap; one which is simple, durable, cheap to construct and easy to install; and one possessing further and other advantages better apparent from a detailed description of the invention which is as follows.

Referring to the drawings, and for the present to Figs. 1 to 5 inclusive, 1 represents a collecting basin set into the concrete or other floor C, and provided with the usual grating 2 to the under side of which is attached the bell or deflector 3, these features being well understood in the art. Formed with (or carried by) the basin 1 is a central hollow cylindrical boss or hub 4 projecting partly below and partly above the bottom of the basin, the upper portion of said hub extending into the bell 3 to a point above the plane of the lower edge of the said bell and spaced from the bell, the free end of said upper portion being spanned by a wire or equivalent screen or strainer 5 secured in place in any suitable mechanical manner. The axis of the hub 4 (about which the bell is symmetrically disposed) is coincident with the axis of the upper portion of the soil or sewer pipe 6, whose upper terminal is formed into an enlargement 6', the upper face of the shoulder *s* at the base of the enlargement serving to support the more or less conical cast iron ring 7 between which and the inner wall of the enlarged portion 6' of the sewer pipe is placed a bottom packing ring of oakum 8 partially supported by the shoulder *s* (and partially by the walls of the ring 7), and an upper packing ring 9 of lead or its equivalent, the upper end of the ring 9 and the corresponding ends of the portions 6' and ring 7 terminating in substantially the same horizontal plane (Fig. 1). The upper thickened portion of the ring 7 is interiorly screw threaded, said screw threaded portion receiving the outer screw-threaded bottom portion of a hollow brass valve-seat member and guide 10 which when screwed the proper distance into the ring 7 is arrested by the limiting shoulder or flange 11, the member 10 terminating in an upper enlarged portion 10' which forms a shoulder or annular seat *h* for engagement with the free end of the lower or depending portion of the hub 4. The outer wall of the portion 10' is provided with studs or lugs 12 for application thereto of a wrench or equivalent tool (not shown) by means of which the member 10 may be screwed into or unscrewed from the ring 7.

Spanning the member 10 at a point substantially at the base of the enlargement 10' are diametrically disposed arms 13 radiating from a central hollow hub or guide 14, forming a "spider" through which freely operates the stem 15, said stem projecting upwardly well into the bell 3 where it terminates in a lock nut *n* and washer *w*, a coiled expansion balance spring 16 encircling the stem being interposed between the washer and the bearing or hub 14, the latter serving as a stationary or fixed abutment for the spring, the tension whereof may be readily adjusted by the nut *n* and washer *w* which jointly serve as an adjustable abutment for the spring. Obviously, the screen 5 must have a section removed therefrom to allow for the free passage therethrough of the stem 15 with its encircling spring 16. The lower screw-threaded terminal or that projecting below the hub 14 is screwed into the socket $t$ at the apex of the conical portion of the check-valve V, the base of the cone having depending therefrom the cylindrical portion $e$, between which and the conical portion is formed an inclined or conical seat $b$ adapted to engage a corresponding inclined seat $b'$ adapted to engage a corresponding inclined seat $b'$ on the lower end of the member 10 (Figs. 1, 3). Disposed on the conical portion of the valve V are a series of radiating vanes, wings or ribs 17 terminating substantially even with the free end of the socket $t$, the outer edges of the vanes being disposed along the surface of a cylinder and freely playing in the cylindrical bore or passage of the seat member 10. The tension of the spring 16 is so adjusted that it is just sufficient to overcome the gravity or weight of the valve V, its stem 15 and wings 17 and normally hold the valve to its seat on the member 10. Preferably the parts V, 15, 17 are composed of aluminum or other light material, thereby requiring a comparatively weak spring to hold the valve to its seat, a slight accumulation of water on the valve serving to overcome the tension of the spring, thus unseating the valve and allowing the water to drain into the sewer pipe.

The operation of the trap can be readily understood from the foregoing. The assembling of the several parts of the trap may be accomplished by the ordinary mechanic, and the manner of assembling having been sufficiently described need not be repeated. It is apparent that no sewer water can back through the trap inasmuch as the packed joints form seals which are both water and gas tight (that is to say the joints packed by the rings 8, 9), and any back pressure will tend to all the more forcibly drive the valve V to its seat. The permanent seating of the valve prevents any sewer gas leaking past the valve and contaminating the atmosphere in the room where the trap is situated. Surface waters flushed or directed into the basin 1 will flow upwardly over the upper edge of the hub 4 past the strainer 5, thence through the hub 4 and member 10 on top of the valve, and the moment the weight of the water resting on the valve overcomes the tension of the weak spring 16, the valve is unseated and the water escapes through the pipe 6.

In lieu of providing a ring 7 with the valve-seat member 10 screwed thereto, I may provide a single member 20 of a form such as shown in Fig. 6, seated on the shoulder $s$, the upper portion of said member being provided with a flaring extension $d$ leading from a point below the upper end of the cylindrical portion of the member, thus forming an annular trough $i$, the bottom of which engages the lower end of the hub 4. The lead packing 9 resting on the oakum ring 8 need not reach to the upper end of the pipe enlargement 6'. In other respects the modification referred to does not differ from the first form described, and accordingly the parts corresponding to those described in connection with the first form are identified by the same reference symbols. I do not of course wish to be limited to the precise details shown as they may in a measure be departed from without affecting the nature or spirit of my invention. Obviously, the invention is not restricted specifically to sewer traps, but may be applied to any drain trap.

Should any gases for any reason leak past the valve, they would be checked by the water seal formed between the lower edge of the bell 3 and the upper end of the hub 4, a small amount of water whose surface is represented by the dotted line $x$, usually remaining in the bottom of the basin to form such seal. Of course if the seat surfaces $b$, $b'$, are carefully machined and made true and the balance spring 16 carefully adjusted to normally keep the valve seated, the chances are slight that any gases will get by the valve.

The valve B being hollow permits a cushion of air to accumulate under it with a sudden rise of back water. This action allows dispensing with the spring 16 in cases where there is no sewer gas, the valve being lifted by said air cushion, and seated before any water can pass the valve.

Having described my invention, what I claim is:

In combination with a trap-basin provided with a central hollow discharge hub having a portion depending below the basin bottom, a drain pipe terminating in an upper terminal enlargement about the axis of the hub, a hollow valve-seat member engaging the depending portion of the hub aforesaid and forming a seal with the enlargement of the drain pipe, a member spanning the valve-seat member at the base of the depending portion aforesaid and provided with a central hub, a valve-stem loosely operating through, and extending partly above and partly below said hub, and a spring-controlled valve on the stem maintained in cooperative relation to the valve-seat member.

In testimony whereof I affix my signature, in presence of two witnesses.

GEORGE W. MOON.

Witnesses:
Emil Starek,
Jos. A. Michel.